United States Patent
Jaoui et al.

(10) Patent No.: US 9,762,055 B2
(45) Date of Patent: Sep. 12, 2017

(54) ELECTRIC ENERGY STORAGE SYSTEM COMPRISING AN INVERTER

(71) Applicant: SAFT, Bagnolet (FR)

(72) Inventors: Younes Jaoui, Bruges (BE); Christophe Morin, Saint Aubin de Medoc (FR)

(73) Assignee: SAFT, Bagnolet (FR)

( * ) Notice: Subject to any disclaimer, the term of this patent is extended or adjusted under 35 U.S.C. 154(b) by 1027 days.

(21) Appl. No.: 13/871,461

(22) Filed: Apr. 26, 2013

(65) Prior Publication Data

US 2013/0285459 A1 Oct. 31, 2013

(30) Foreign Application Priority Data

Apr. 27, 2012 (FR) ..................... 12 53910

(51) Int. Cl.
| | |
|---|---|
| H02J 1/00 | (2006.01) |
| H02J 1/10 | (2006.01) |
| H02J 3/32 | (2006.01) |
| H02M 3/158 | (2006.01) |
| H02J 7/02 | (2016.01) |

(52) U.S. Cl.
CPC ........... *H02J 1/10* (2013.01); *H02J 3/32* (2013.01); *H02J 7/022* (2013.01); *H02M 3/1582* (2013.01); *H02M 3/1584* (2013.01); *Y10T 307/696* (2015.04)

(58) Field of Classification Search
CPC ...................................... H02J 1/00; H02J 3/00
USPC .......................................................... 307/80
See application file for complete search history.

(56) References Cited

U.S. PATENT DOCUMENTS

| | | | | | |
|---|---|---|---|---|---|
| 5,047,911 | A | * | 9/1991 | Sperzel ............... | H02M 3/3353 323/356 |
| 5,838,552 | A | * | 11/1998 | Fraidlin ............ | H02M 3/33569 363/16 |
| 5,883,495 | A | * | 3/1999 | Smith ................... | H02J 7/0031 320/128 |
| 6,222,723 | B1 | * | 4/2001 | Razoumov ............. | H01G 9/155 361/502 |
| 6,329,796 | B1 | * | 12/2001 | Popescu ................... | H02J 1/10 320/134 |
| 8,513,920 | B2 | * | 8/2013 | Scaldaferri ........... | H02J 7/0052 320/137 |
| 2002/0041126 | A1 | * | 4/2002 | Provanzana .............. | H02J 3/28 307/48 |
| 2010/0045244 | A1 | * | 2/2010 | Fuchs ................... | H02N 2/067 320/166 |

(Continued)

OTHER PUBLICATIONS

French Search Report for FR 12 53 910 dated Feb. 6, 2013.

*Primary Examiner* — Rexford Barnie
*Assistant Examiner* — Joseph Inge
(74) *Attorney, Agent, or Firm* — Sughrue Mion, PLLC (57) ABSTRACT

The invention relates to an electric energy storage system, comprising an inverter (6), several associations (21, 22), of an electric energy storage unit (1, 2) in series with a bidirectional chopper (3, 4), connected in parallel to a same input of the inverter (6), on the side of their chopper (3, 4), characterized in that at least one bidirectional chopper (3, 4), associated with an electric energy storage unit (1, 2) that can be charged and discharged asymmetrically, is sized asymmetrically for the charge and discharge of said associated storage unit (1, 2).

20 Claims, 4 Drawing Sheets

(56) References Cited

U.S. PATENT DOCUMENTS

| | | | | |
|---|---|---|---|---|
| 2011/0133556 A1* | 6/2011 | Choi | ................ | H02J 3/383 |
| | | | | 307/65 |
| 2011/0248748 A1* | 10/2011 | Koto | ................ | G01R 19/0092 |
| | | | | 327/108 |
| 2012/0043923 A1* | 2/2012 | Ikriannikov | ................ | H02J 1/10 |
| | | | | 320/103 |
| 2012/0074949 A1* | 3/2012 | Kepley | ................ | H02M 3/33584 |
| | | | | 324/426 |

* cited by examiner

ELECTRIC ENERGY STORAGE SYSTEM COMPRISING AN INVERTER

BACKGROUND OF THE INVENTION

The present invention relates to the field of electric energy storage systems comprising an inverter. These energy storage systems comprise electric energy storage units and are often coupled to an AC network to store electric energy when the AC network has too much or does not need any and to restore the electric energy to the AC network when it needs it. This excess electric energy, which is temporarily stored in the electric energy storage system to then be provided to the AC network, may either come from the AC network or from energy sources, which are preferably renewable, for example such as solar panels or wind turbines.

In an electric energy storage system of a certain size, which must be connected to an AC network, several electric energy storage units are used. These electric energy storage units may be used individually, in a group or in their entirety, at a given moment, depending on the needs of the AC network. At least one inverter, which is a DC/AC converter, is positioned between the electric energy storage units on the one hand and the AC network on the other hand.

The problem then arises of the number of inverters to be used and how to connect the inverter(s) to the electric energy storage units. This is particularly more pronounced inasmuch as the voltages of the electric energy storage units are not necessarily balanced relative to one another, for several reasons. First, the electric energy storage units of a same electric energy storage system may use different technologies or may have different behaviors, for example a power battery behavior and an energy battery behavior. Additionally, the voltage level of certain electric energy storage units may be incompatible with the voltage level of the AC network and may require additional adapter components. For example, this may involve the need to add a boost transformer to ensure the operation of a battery with a low output voltage with an AC network with a high network voltage, for example 600 VDC and 480 VAC.

According to a first prior art, for example described in FIG. 1, which will be outlined later, it is known to connect, in parallel on an AC voltage network, several associations each comprising a battery directly serially connected with an inverter, each inverter being sized for the associated battery. One drawback of this first prior art is the complexity and overall cost of the electric energy storage system, as it comprises several inverters, the inverter being a relatively complex and expensive component.

According to a second prior art, for example described in Chinese patent application CN 102122826, it is known to connect, in parallel at the input of a shared inverter, several associations each comprising a battery in series with a chopper, which is a DC/DC converter. Although using a shared inverter, oversized relative to each of the choppers that are connected in parallel to its input, makes it possible to save in terms of cost and complexity, the addition of several choppers nevertheless creates losses in terms of cost and increased complexity. The cost and complexity balance is positive, but only moderately so. Further, the use of complex choppers comprising many power switches reduces the effectiveness of the power balance.

According to a third prior art, for example described in patent application US 2011/0133556, it is known to connect, in parallel to the input of a shared inverter, several associations each comprising a battery in series with a chopper, which is a DC/DC converter. Although using a shared inverter, oversized relative to each of the choppers that are connected in parallel to its input, makes it possible to save in terms of cost and complexity, the addition of several choppers nevertheless creates losses in terms of cost and increased complexity. The cost and complexity balance is positive, but only moderately so. Additionally, this facility relates to an extra energy storage system for powering, by the AC network, of an installation of modest size, for example an individual home. It may not be used to power the AC network itself.

SUMMARY OF THE INVENTION

The aim of the present invention is to provide an electric energy storage system at least partially offsetting the aforementioned drawbacks.

More particularly, the invention aims to provide an electric energy storage system which, in addition to decreasing the cost and complexity of the system by using a shared inverter at the input of which several electric energy storage units are connected in parallel by means of respective choppers, further decreases the cost and complexity of the system by decreasing the cost and complexity of at least one or more of said choppers.

The choppers have the advantage of allowing electric energy storage units of different types to be connected to the input of the inverter. The energy storage units of different types are either electric energy storage units with different technologies, for example batteries and supercapacitors, or different behaviors, for example power batteries and energy batteries.

Different battery technologies may also be combined, for example such as alkaline batteries with lithium-ion batteries, and/or with fuel cells (SOFC). The batteries may be combined with supercapacitors, also called ultracapacitors, or electric double layer capacitors.

The choppers also have the advantage of stabilizing the voltage at their respective outputs. This stabilized output voltage of the choppers makes it possible to use a shared inverter that is less oversized than if the electric energy storage units were directly connected in parallel to the input of the shared inverter.

To allow the charge and discharge of the electric energy storage units, the choppers are bidirectional. If one or more electric energy storage units only operated in one direction, for example charging or discharging, the associated chopper(s) would be monodirectional.

In fact, in the second and third prior arts, all of the choppers used are symmetrical choppers. A symmetrical chopper is a chopper sized symmetrically for the charge and discharge of the electric energy storage unit with which it is associated.

According to the invention, on the other hand, at least one or several of these choppers, or optionally all of said choppers, is or are asymmetrically sized. An asymmetrically-sized chopper is a chopper sized asymmetrically for the charge and discharge of the electric energy storage unit with which it is associated. In an asymmetrical chopper, in one direction, i.e., charge or discharge, all or some of the electric components are undersized relative to the electric components of the other direction, discharge or charge. For at least some of the electric components of the chopper, the electric component(s) used in one direction have a maximum allowable current (in normal or rated operation) that is lower than that same maximum allowable current for the electric component(s) used in the other direction.

Using a shared inverter makes it possible to put the electric energy storage units in parallel at the input of the shared inverter, with a reduction in complex inverter control cards and power switches, for the inverter stage of the electric energy storage system.

To meet the need to connect several electric energy storage units in parallel to the AC network in an electric energy storage system, according to the invention, it is proposed to use a shared inverter and several intermediate bidirectional choppers, so as to be able to optimize their sizing in the charge direction of the electric energy storage unit and in the discharge direction of the electric energy storage unit. This results in optimizing the cost and size of the semiconductors used, causing overall cost and complexity optimization in the electric energy storage system.

Further, this electric energy storage system architecture also makes it possible, while enabling individual optimization for each type of electric energy storage unit, to use electric energy storage units with different technologies with currents adapted to each technology.

To that end, the present invention proposes an electric energy storage system comprising: an inverter, several associations of an electric energy storage unit in series with a bidirectional chopper, connected in parallel to a same input of the inverter, on the side of their chopper, characterized in that at least one bidirectional chopper, associated with an electric energy storage unit that can be charged and discharged asymmetrically, is sized asymmetrically for the charge and discharge of said associated storage unit.

The present invention also proposes an electric energy storage system circuit, comprising, successively connected in series, an electric energy storage unit that can be charged and discharged asymmetrically, a bidirectional chopper and an oversized inverter relative to the bidirectional chopper, characterized in that the bidirectional chopper is sized asymmetrically for the charge and discharge of the storage unit.

Preferably, there is a DC bus at the input of the inverter and all of the choppers outputs are connected to that DC bus. The DC bus, where all of the outputs of the electric energy storage units are connected, simply and easily enables an optional exchange of energy between two electric energy storage units.

According to preferred embodiments, the invention comprises one or more of the following features.

Preferably, at least some of the bidirectional choppers, preferably all of the bidirectional choppers, respectively associated with storage units capable of being charged and discharged asymmetrically, are sized asymmetrically for the charge and discharge of said associated storage units.

Preferably, one or more of said asymmetrically-sized bidirectional choppers are sized asymmetrically such that their power switch(es) used in the discharge direction have a maximum allowable current greater than that of their power switch(es) used in the charge direction.

Preferably, one or more of these asymmetrically-sized bidirectional choppers are sized asymmetrically such that their power switch(es) used in the charge direction have a higher maximum allowable current greater than that of their power switch(es) used in the discharge direction.

Preferably, one or more of these asymmetrically-sized bidirectional choppers are sized asymmetrically such that their power switch(es) used in the discharge direction have a maximum allowable current higher than that of their power switch(es) used in the charge direction, one or more of these asymmetrically-sized bidirectional choppers are sized asymmetrically such that their power switch(es) used in the charge direction have a maximum allowable current higher than that of their power switch(es) used in the discharge direction, the power switches of the inverter are sized so that their maximum allowable current is lower, preferably at least 10% lower, still more preferably at least 20% lower, than the sum of the maximum allowable power switch current upper bounds respectively of all of the choppers connected to said same input of the inverter, if applicable increased by the maximum allowable currents of any storage unit(s) not associated with choppers but connected to said same inverter input.

Preferably, said higher maximum allowable current of the power switch(es) of the asymmetrically-sized bidirectional choppers is higher by at least a factor of 1½, preferably at least a factor of 5, still more preferably at least a factor of 20.

Preferably, said asymmetrically-sized bidirectional chopper(s) each comprise no more than four power switches, preferably each no more than two power switches.

Preferably, said power switch(es) may be chosen from among one or several families of transistors including power transistors of the IGBT (Insulated Gate Bipolar Transistor) type or the GTO (Gate Turn Off thyristor) type or the Thyristor or MOSFET or JFET or BIPOLAR type.

Preferably, the power of the inverter is comprised between 50 kW and 5 MW, preferably comprised between 500 kW and 2 MW.

Preferably, among the electric energy storage units, there are one or more batteries and/or one or more supercapacitors.

Preferably, the number of said associations is comprised between 2 and 15, preferably between 5 and 10.

Preferably, the bidirectional chopper or the majority, or preferably all, of the bidirectional choppers, belonging to one or more of said associations and being sized asymmetrically, is or are (a) booster chopper(s).

Preferably, the input voltage of the inverter is comprised between 300 and 2000 V, preferably between 400 and 1500 V, still more preferably between 600 and 1200 V.

Preferably, the electric energy storage system comprises a controller for the inverter that drives the inverter and a controller of the storage units that drives the storage units, the two controllers being connected to each other so as to synchronize the two commands with each other or in that it comprises a controller for the inverter that drives the inverter and several controllers for the storage units, respectively, that drive the storage units, the controller for the inverter being connected to the respective controllers of the storage units so as to synchronize its driving with their respective driving operations.

According to the invention, an electrical facility is also provided comprising an AC electrical network and an electrical energy storage system according to any one of the preceding claims that is connected to said AC electrical network so as to be able to power said AC electrical network.

Preferably, the electrical facility is an electricity production or distribution facility.

Preferably, one or more solar panels and one or more fuel cells and one or more wind turbines are connected after voltage adaptation, in parallel with the energy storage units, to said input of the inverter, preferably respectively by means of one or more monodirectional choppers.

DESCRIPTION OF THE DRAWINGS

Other features and advantages of the invention will appear upon reading the following description of a preferred embodiment of the invention, provided as an example and in reference to the appended drawing.

DETAILED DESCRIPTION

The electric energy storage units are often batteries. An electric energy storage unit may be a battery, part of a battery, or a group of batteries. In the rest of the text, the term battery will be used indifferently with the expression electric energy storage unit. The batteries used may use the same technology or different technologies. A battery may be replaced by another type of electric energy storage unit, for example a supercapacitor.

A bidirectional chopper may be symmetrical or asymmetrical, while an inverter is symmetrical. An asymmetrical bidirectional chopper is an asymmetrically-sized chopper. The power switches of an asymmetrical bidirectional chopper may therefore have different sizes, some used for a usage direction being smaller, i.e., charge or discharge, of the battery, relative to other(s) used in the other direction that will be larger. The power switches of an inverter are the same size in both directions; they are furthermore preferably all the same size with respect to one another.

Figure 1:
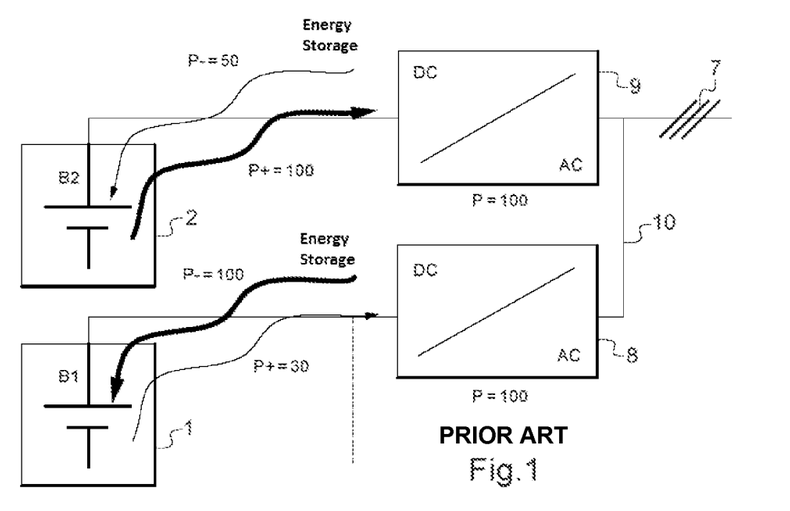
FIG. 1 shows a diagrammatic example of an energy storage system comprising several inverters, according to one prior art.

FIG. 1 shows a diagrammatic example of an energy storage system comprising several inverters, according to one prior art. The energy storage system comprises a battery 1 in series with an inverter 8, a battery 2 in series with an inverter 9, the inverters 8 and 9 being connected to an AC bus 10 which in turn is connected to the AC network 7.

In the case where the batteries 1 and 2 have different needs, one needing more charge power P− and the other more discharge power P+, the charge power requirement for the battery 1 is for example 100 and the discharge power requirement for that same battery 1 is for example 30, the charge power requirement for the battery 2 is for example 50 and the discharge power requirement for that same battery 2 is for example 100, each of the inverters 8 and 9, which are symmetrical, will have a power requirement of 100 and will therefore be sized accordingly.

The total number of power switches will be at least 12 power switches, 6 power switches per inverter.

If one wishes to more minutely assess the complexity and the overall cost of the part of the electric energy storage system situated downstream from the batteries, it is necessary to identify the number and size of the power switches, their size being proportional to the current for a same considered maximum voltage. In the case of the two inverters without a chopper, the input voltage of the inverter may vary for example by a factor of 1.5. An oversize coefficient of 1.5 on the current should then be applied. Twelve power switches will therefore be needed with a power requirement of 150 per power switch, for a total of 1800, that figure representing the participation of that part of the electric energy storage system in the cost and overall complexity.

Furthermore, two control systems are necessary, one per inverter, which are relatively complex devices increasing the complexity and the overall costs of the electric energy storage system.

Figure 2:
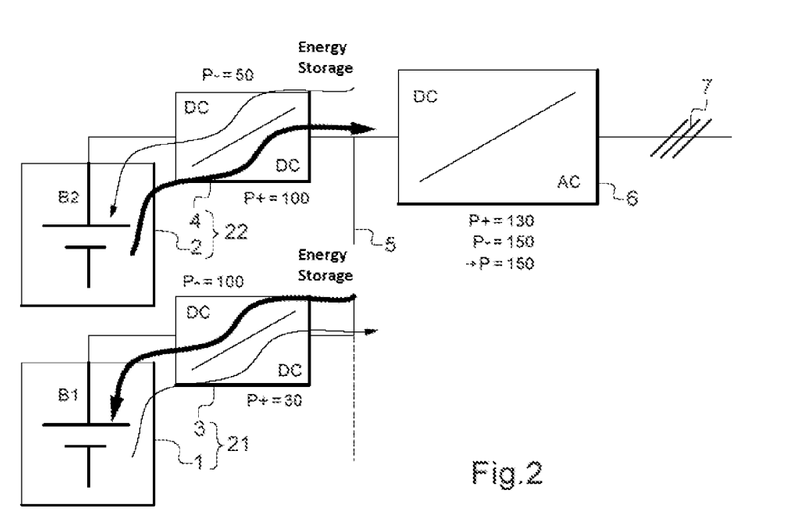
FIG. 2 shows a diagrammatic example of the central part of an energy storage system comprising an inverter, according to the invention.

FIG. 2 shows a diagrammatic example of the central part of an energy storage system comprising an inverter, according to the invention. The electric energy storage system comprises a battery 1 in series with a chopper 3, a battery 2 in series with a chopper 4, the choppers 3 and 4 being connected to the DC bus 5 which in turn is connected to a shared inverter 6 which in turn is connected to the AC network 7. Here, the electric energy storage system only comprises two serial associations 21 and 22 of a battery 1 and 2, respectively, with a chopper 3 and 4, respectively. The shared inverter 6 may be connected to the AC network 7 with or without going through a medium-voltage transformer. The AC network 7 is for example a 380 V network.

In the same case where the batteries 1 and 2 have different requirements, one requiring more charge power P− and the other requiring more discharge power P+, the charge power requirement for the battery 1 is for example 100 and the discharge power requirement for that same battery 1 is for example 30, the charge power requirement for the battery 2 is for example 50 and the discharge power requirement for that same battery 2 is for example 100, the shared inverter 6, which is symmetrical, will have a charge power requirement of 150 and a discharge power requirement of 130. Since the shared inverter 6 is symmetrical, it will therefore be sized so as to meet a power requirement of 150. Relative to the case of FIG. 1, it can be seen that the shared inverter is undersized relative to a shared inverter that would have corresponded to the sum of the two individual inverters of FIG. 1 and that would have been sized so as to meet a power requirement of 200.

The total number of power switches will be at least 10 power switches, 6 power switches for the inverter and 2 power switches for each of the two bidirectional choppers. Here again, the total number of power switches is lower.

If one wishes to more minutely assess the complexity and the overall cost of the part of the electric energy storage system situated downstream from the batteries, it is necessary to identify the number and size of the power switches, their size being proportional to the current for a same considered maximum voltage. In the case of a shared inverter with two asymmetrical bidirectional choppers, the input voltage of the inverter is stabilized. Therefore, no oversizing coefficient on the current is necessary. Ten power switches are therefore required, including 6 power switches with a power requirement of 150 for the shared inverter 6, one power switch with a power requirement of 30 and one power switch with the power requirement of 100 for the asymmetrical bidirectional chopper 3, one power switch with a power requirement of 50 and one power switch with a power requirement of 100 for the asymmetrical bidirectional chopper 4, which yields a total of 1180, that figure representing the participation of that part of the electric energy storage system in the cost and overall complexity, as compared to the result of 1800 obtained with the architecture of FIG. 1. The lower result is better, since it reflects a lower complexity and cost.

Using the general architecture of the second and third prior arts and simplifying the structure of the symmetrical bidirectional choppers, the result obtained would have been 1600. In fact, 10 power switches would have been needed, including 6 power switches with a power requirement of 200 for the shared inverter, oversized relative to the shared inverter of FIG. 2 due to the presence of symmetrical, and not asymmetrical, bidirectional choppers, two power switches with a power requirement of 100 for each symmetrical bidirectional chopper, which yields a total of 1600, which is better than the architecture of FIG. 1 according to the first prior art, but not as good as the architecture of FIG. 2 according to the invention.

In the architecture of FIG. 2, however, as in the architecture of the second and third prior arts, only one control system for the shared inverter is necessary.

These calculations were done in the context of the connection of two batteries to a shared inverter. The number of batteries connected to the input of the shared inverter may be strictly greater than two. The number of such associations may advantageously be comprised between 2 and 15, preferably between 5 and 10.

The higher the number of batteries connected to the shared inverter, the more pronounced the preceding deviations will generally be. When the asymmetry of the power requirement, for the charge and discharge, of all of the batteries connected to the shared inverter is in the same direction, i.e., when all of the batteries have a higher charge power requirement or when all of the batteries have a higher discharge power requirement, the previous deviations will on the other hand be reduced, since the only power component gain will then occur at the asymmetrical bidirectional choppers, without a reduction effect caused by the gain in power components also done at the shared inverter. It is possible to use symmetrical choppers in place of only some of the asymmetrical choppers: this downgraded version of the invention nevertheless yields a lower gain in terms of cost and complexity decrease of the electric energy storage system.

The preferred architecture proposed in FIG. 2 introduces an asymmetrical bidirectional chopper 3 or 4 in series with each battery 1 or 2 connected in parallel with other batteries at the input of a shared inverter 6, at a DC bus 5. Some of the batteries 1 and 2 can be sized for energy applications, and others for power applications. Their output voltages will then not be balanced. An asymmetrical bidirectional chopper 3 or 4, which is a reversible DC/DC converter sized differently in the charge direction and the discharge direction, is inserted between each battery 1 or 2 and the DC bus 5 connected to the input of the shared inverter 6. The reversibility of the asymmetrical bidirectional choppers is obtained by using a reversible assembly or by putting two different unidirectional choppers in parallel operating in opposite directions.

The sizing of the asymmetrical bidirectional choppers is adapted to the power requirement in both directions for each chain comprising the serial association of the battery and an asymmetrical bidirectional chopper. For chains where the required power is greater in the charge direction, the power switches used to condition the voltage in that direction have a higher caliber than the power switches in the other direction, and vice versa for the chains whereof the required power is greater in the discharge direction.

In the calculation example done between FIGS. 1 and 2, the power switches of the shared inverter 6 are sized so that their maximum allowable current is 25% lower (passage from a power requirement of 200 to a power requirement of 150) than the sum of the maximum allowable power switch current upper bounds respectively of all of the asymmetrical bidirectional choppers, whereof the power requirement is 100 and there are two of them, connected to the same input of the shared inverter 6. In the architecture of FIG. 2, the shared inverter 6 is undersized, owing to the presence of asymmetrical bidirectional choppers 3 and 4, while completely meeting the power requirements in all operating situations, including when all of the batteries operate at the same time, relative to the shared inverter that would have been necessary with symmetrical bidirectional choppers. In reality, the shared inverter 6 is not oversized relative to the requirements, which guarantees optimization in terms of cost and complexity of that shared inverter 6.

In the example of the architecture of FIG. 2, the greater maximum allowable current of the power switch of each asymmetrically-sized bidirectional chopper is higher by a factor of two for the chopper 4, and a factor of slightly more than three for the chopper 3.

In the example of the architecture of FIG. 2, each asymmetrically-sized bidirectional chopper preferably comprises two power switches. This is shown by example embodiments of electrical circuits presented later in light of FIGS. 4 to 7.

In the example of the architecture of FIG. 2, each asymmetrically-sized bidirectional chopper 3 or 4 is a booster chopper. The use of booster choppers 3 and 4 at the input of the shared inverter 6 enables that shared inverter 6 to experience a higher fixed voltage and therefore to be optimized as a result, in particular in terms of the size of the power switches, which is reduced, and the reduced magnetic circuits. This input voltage of the shared inverter is advantageously comprised between 300 and 2000 V, preferably between 400 and 1500 V, still more preferably between 800 and 1200 V, which represents a high voltage.

Figure 3:
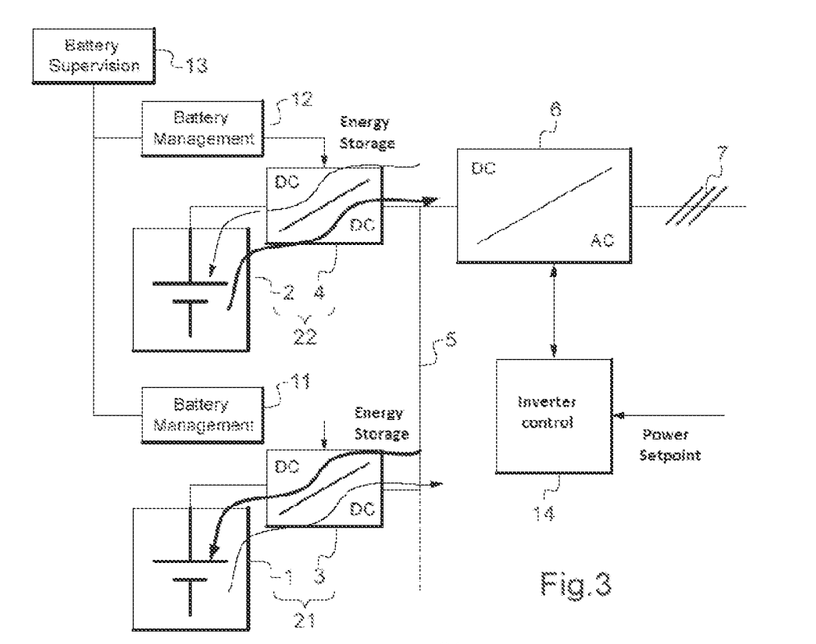
FIG. 3 shows a diagrammatic example of the central part of an energy storage system comprising an inverter, showing several peripheral functions of the storage system, according to the invention.

FIG. 3 shows a diagrammatic example of the central part of an energy storage system comprising an inverter, showing several peripheral functions of the storage system, according to the invention. The elements already described with respect to FIG. 2 will not be described again.

Each chopper 3 or 4 has its own management system 11 or 12, for an associated battery 1 or 2. The battery management systems 11 and 12 are connected to an overall monitoring system that is the controller 13 of the batteries 1 and 2 and that drives the batteries 1 and 2 by means of management systems 11 and 12.

The shared inverter 6 is connected to a controller 14 that drives the shared inverter 6. The controller 14 of the shared inverter 6 and the controller 13 of the batteries 1 and 2 are connected to each other so as to synchronize their two respective driving operations with respect to each other. The controller 13 of the batteries 1 and 2 is at a higher level than the management systems 11 and 12 specific to the batteries 1 and 2. It may be integrated into the controller 14 of the shared inverter 6 or into the power management of the facility or into the controllers 11 and 12 of the batteries 1 and 2. The role of this controller 13 of the batteries 1 and 2 is to designate a priority order between the batteries 1 and 2 as a function of the nature of the considered application or the considered use.

The controller 14 of the shared inverter 6 receives a consumed power setpoint on the AC network 7 or power supplied on the AC network 7. The controller 14 of the shared inverter 6 regulates the three-phase currents on the AC network 7 and regulates the input voltage of the shared inverter, which is the voltage of the DC bus 5.

Each battery 1 and 2 strictly speaking or other type of electric energy storage unit has a management system 11 and 12 adapted to it and therefore enables an adaptation, to the energy or power need, for the application and the technology of the type of electric energy storage unit used. By means of each associated management system 11 or 12, each corresponding asymmetrical bidirectional chopper 3 or 4 controls the current in both directions, both in the charge direction and the discharge direction, for its respective battery 1 or 2, asymmetrically as a function of the different charge and discharge requirements.

The electric energy storage system previously described can be connected to an AC electrical network 7 within an electrical facility so as to be able to power said AC electrical network. This electric energy storage system is preferably positioned in an external container. The power of the shared inverter 6 may advantageously be comprised between 50 kW and 5 MW, preferably comprised between 500 kW and 2 MW, which corresponds to the power supply of a large facility. The electrical facility is advantageously an electrical facility with energy production units associated with energy storage units. In this electrical facility, one or more solar panels and/or other sources, such as one or more wind turbines, are connected after adapting the voltage, in parallel with the batteries 1 and 2, to the input of the shared inverter 6, respectively by means of one or more monodirectional choppers.

The invention also relates to an electric energy storage system circuit, comprising, successively connected in series, a battery 1 that can be charged and discharged asymmetrically, an asymmetrical bidirectional chopper 3 and an oversized inverter 6 relative to the chopper 3, the bidirectional chopper 3 being sized asymmetrically for the charge and discharge of the battery 1. The inverter is oversized relative to the chopper 3, as its input is also designed to receive the output of another chopper, for example the chopper 4. The circuit corresponds to a charge or discharge line between a battery 1 and the AC network 7.

FIGS. 4 to 8 show examples of electrical circuits forming the central part of an energy storage system comprising an inverter according to the invention. In the shared inverter 6, as in the asymmetrical bidirectional choppers 3 and 4 of FIGS. 2 and 3, the power switches each comprise a single power transistor that can be obtained by putting transistors and diodes in parallel, in series or series/parallel. These power transistors may for example be of the IGBT (Insulated Gate Bipolar Transistor) type or the GTO (Gate Turn Off thyristor) type or the Thyristor or MOSFET or JFET or BIPOLAR type.

The power switches, which comprise a power transistor T mounted head-to-tail with the diode D, are denoted I; they are driven by means of the gate of the transistor T. The diodes are denoted D. The inductances are denoted L; they are equivalent to several millihenries. The diodes D, switches I, transistors T, inductances L, do not necessarily have the same values from one element to the next. For example, two inductances L may have different values with respect to each other.

In each of FIGS. 4 to 8, the connection of a single serial association of a battery with an asymmetrical bidirectional chopper is shown; however, the input of the inverter, which is the node N2, is designed to receive several associations of similar types. The energy storage system comprises a shared inverter 6, an asymmetrical bidirectional chopper, and a battery 1. The battery 1 is connected between the node N1, input of the chopper, and the ground. Between the node N2, which is both the input of the shared inverter 6 and the output of the chopper, and the ground is a capacitance 50. A DC power supply 51 is connected to the node N2.

The inverter 6 comprises inner nodes N6, N7 and N8. Between the three inner nodes N6, N7 and N8 on the one hand and the AC network 7 on the other hand, three inductances L are respectively connected in parallel. Between the input N2 of the inverter 6 on the one hand and the three inner nodes N6, N7 and N8 on the other hand, three power switches I are respectively connected in parallel. Between the three inner nodes N6, N7 and N8 on the one hand, and the ground on the other hand, three power switches I are respectively connected in parallel.

Figure 4:
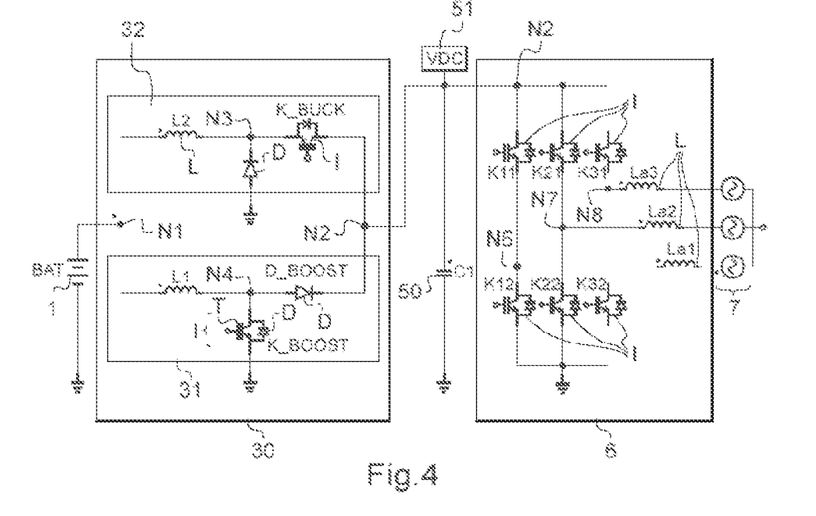
FIG. 4 shows a first example of an electrical circuit forming the central part of an energy storage system comprising an inverter, according to the invention.

FIG. 4 shows a first example of an electrical circuit forming the central part of an energy storage system comprising an inverter, according to the invention. The asymmetrical bidirectional chopper 30 comprises a boost conversion stage 31 for the discharge operation of the battery 1 and a buck conversion stage 32 for the charge operation of the battery 1. From the battery 1 to the input N2 of the inverter 6, the chopper 30 is a booster, i.e., it performs a DC/DC conversion with a voltage boost.

The chopper 30 comprises two inner nodes N3 and N4. Between the node N1 and the node N3, an inductance L is connected. Between the node N3 and the ground, a diode D is connected. Between the node N3 and the input N2 of the inverter 6, a power switch I is connected. Between the node N1 and the node N4, an inductance L is connected. Between the node N4 and the ground, a power switch I is connected. Between the node N4 and the input N2 of the inverter 6, a diode D is connected.

Figure 5:
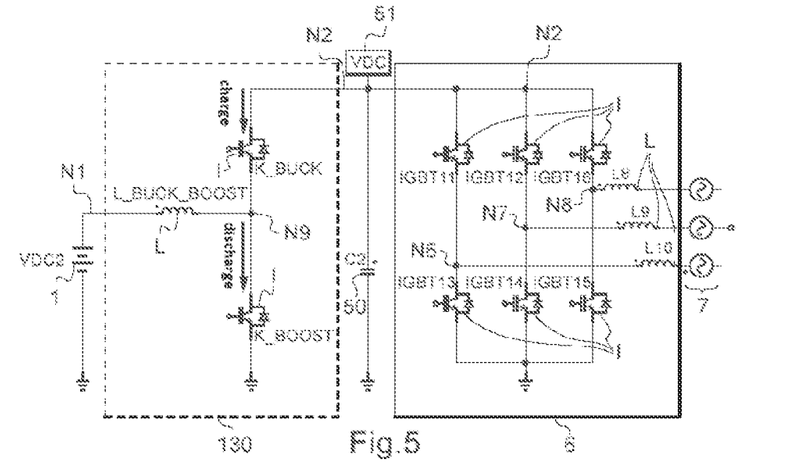
FIG. 5 shows a second example of an electrical circuit forming the central part of an energy storage system comprising an inverter, according to the invention.

FIG. 5 shows a second example of an electrical circuit forming the central part of an energy storage system comprising an inverter, according to the invention. The asymmetrical bidirectional chopper 130 is reversible. From the battery 1 to the input N2 of the inverter 6, the chopper 130 is a booster, i.e., it performs a DC/DC conversion with a voltage boost.

The chopper 130 comprises an inner node N9. Between the node N1 and the node N9, an inductance L is connected. Between the node N9 and the input N2 of the inverter 6, a power switch I is connected. Between the node N9 and the ground, a power switch I is connected. When the battery 1 is charged, the power switch I situated between the nodes N2 and N9 is on while the power switch I situated between the node N9 and the ground is off. During the discharge of the battery 1, the power switch I situated between the nodes N2 and N9 is off while the power switch I situated between the node N9 and the ground is on.

Figure 6:
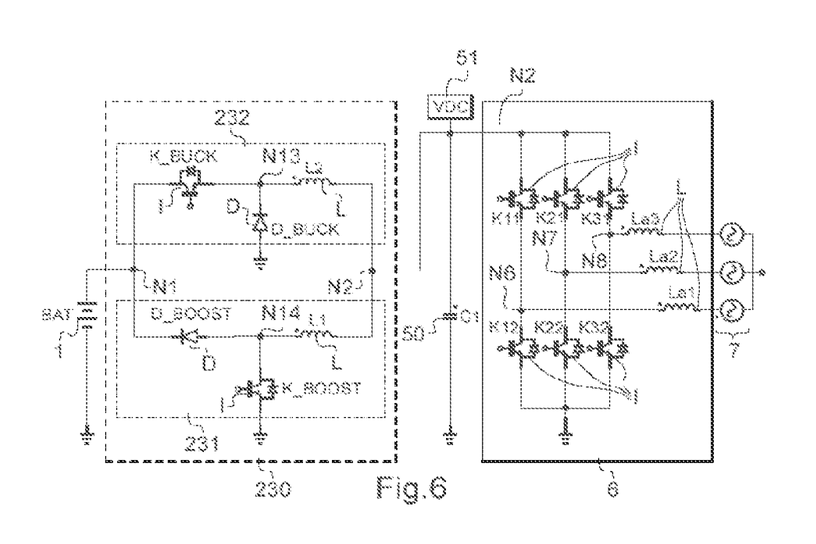
FIG. 6 shows a third example of an electrical circuit forming the central part of an energy storage system comprising an inverter, according to the invention.

FIG. 6 shows a third example of an electrical circuit forming the central part of an energy storage system comprising an inverter, according to the invention. The asymmetrical bidirectional chopper 230 comprises a boost conversion stage 231 for the charge operation of the battery 1 and a buck conversion stage 232 for the discharge operation of the battery 1. From the battery 1 to the input N2 of the inverter 6, the chopper 230 is a buck chopper, i.e., it performs a DC/DC conversion with a voltage decrease.

The chopper 230 comprises two inner nodes N13 and N14. Between the node N1 and the node N13, a power switch I is connected. Between the node N13 and the ground, a diode D is connected. Between the node N13 and the input N2 of the inverter 6, an inductance L is connected. Between the node N1 and the node N14, a diode D is connected. Between the node N14 and the ground, a power switch I is connected. Between the node N14 and the input N2 of the inverter 6, an inductance L is connected.

Figure 7:
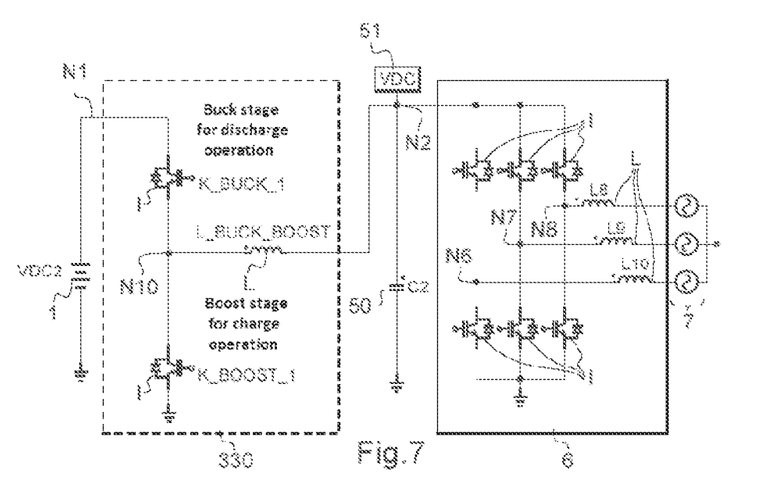
FIG. 7 shows a fourth example of an electrical circuit forming the central part of an energy storage system comprising an inverter, according to the invention.

FIG. 7 shows a fourth example of an electrical circuit forming the central part of an energy storage system comprising an inverter, according to the invention. The asymmetrical bidirectional chopper 330 is reversible. From the battery 1 to the input N2 of the inverter 6, the chopper 330 is a buck chopper, i.e., it performs a DC/DC conversion with a voltage decrease.

The chopper 330 comprises an inner node N10. Between the node N1 and the node N10, a power switch I is connected. Between the node N10 and the input N2 of the inverter 6, an inductance L is connected. Between the node N10 and the ground, a power switch I is connected. The operation is symmetrical with respect to that of FIG. 5. The voltage is lower during discharge, and the voltage is increased during charge.

Figure 8:
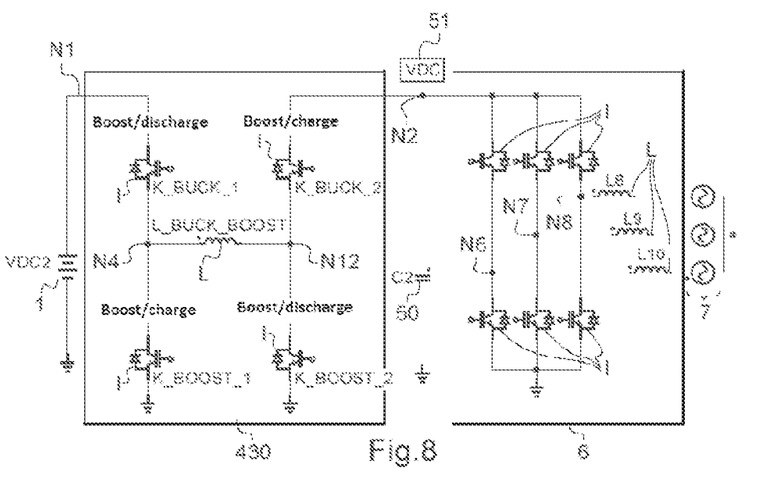
FIG. 8 shows a fifth example of an electrical circuit forming the central part of an energy storage system comprising an inverter, according to the invention.

FIG. 8 shows a fifth example of the electrical circuit forming the central part of an energy storage system comprising an inverter according to the invention. The asymmetrical bidirectional chopper 430 is an asymmetrical bidirectional four-quadrant DC-DC converter capable of operating either as a boost chopper or a buck chopper.

The chopper 330 comprises two inner nodes N11 and N12. Between the node N1 and the node N11, a power switch I is connected. Between the node N12 and the input N2 of the inverter 6, a power switch I is connected. Between the two nodes N11 and N12, an inductance L is connected. Between the node N11 and the ground, a power switch I is connected. Between the node N12 and the ground, a power switch I is connected.

Of course, the present invention is not limited to the examples and embodiments described and shown, but on the contrary is open to many alternatives accessible to those skilled in the art. In particular, the use of the inverter performing the DC/AC conversion between the shared DC bus and the network may have an unlimited number of alternatives in particular using multi-level inverter structures, current or voltage inverters, and having the possibility of operating disconnected from the electrical network or connected thereto. Likewise, the power switches may be replaced by any other semiconductor technologies making it possible to keep the voltages and currents corresponding to the voltage and power levels involved.

The invention claimed is:

1. An electric energy storage system configured to be coupled to an AC network (7) to store and to restore electric energy, said electric energy storage system comprising:
   a shared inverter (6) having an input and several power switches (I),
   several electric energy storage units (1, 2) of different types configured to be charged and discharged asymmetrically, said electric energy storage units (1, 2) being respectively associated with a bidirectional chopper (3, 4) to form a serial association (21, 22) connected in parallel to the same input of the shared inverter (6), on the side of the chopper (3, 4) of each association (21, 22),
   wherein
   at least one bidirectional chopper (3, 4) comprises several power switches of different sizes configured to be used asymmetrically in discharge or charge direction and is sized asymmetrically for the charge and discharge of said associated electric energy storage unit (1, 2) such that the power switch of the bidirectional chopper used in the discharge direction has a maximum allowable current different than that of the power switch used in the charge direction, and
   wherein the power switches (I) of the shared inverter (6) are sized so that their maximum allowable current is lower than the sum of the maximum allowable power switch current upper bounds respectively of all of the choppers (3, 4) connected to said same input of the shared inverter (6), if applicable increased by the maximum allowable currents of any storage unit(s) not associated with choppers but connected to said same input of the shared inverter (6).

2. The electric energy storage system according to claim 1, wherein:
   all of the bidirectional choppers (3, 4) respectively associated with the storage units (1, 2) configured to be charged and discharged asymmetrically, are sized asymmetrically for the charge and discharge of said associated storage units (1, 2).

3. The electric energy storage unit according to claim 2, wherein:
   one or more of said asymmetrically-sized bidirectional choppers (3, 4) are sized asymmetrically such that their power switch (I) used in the discharge direction has a maximum allowable current greater than that of the power switch (I) used in the charge direction.

4. The electric energy storage unit according to claim 2, wherein:
   one or more of these asymmetrically-sized bidirectional chopper (3, 4) are sized asymmetrically such that the power switch (I) used in the charge direction has a higher maximum allowable current greater than that of the power switch (I) used in the discharge direction.

5. The electric energy storage system according to claim 1, wherein:
   one or more of these asymmetrically-sized bidirectional choppers (3, 4) are sized asymmetrically such that the power switch (I) used in the discharge direction has a maximum allowable current higher than that of the power switch (I) used in the charge direction,
   one or more of these asymmetrically-sized bidirectional choppers (3, 4) are sized asymmetrically such that the power switch (I) used in the charge direction has a maximum allowable current higher than that of the power switch (I) used in the discharge direction,
   the power switches (I) of the inverter (6) are sized so that their maximum allowable current is at least 10% lower than the sum of the maximum allowable power switch current upper bounds respectively of all of the choppers (3, 4) connected to said same input of the inverter (6), if applicable increased by the maximum allowable currents of any storage unit(s) not associated with choppers but connected to said same inverter input (6).

6. The electric energy storage system according to claim 3, wherein said higher maximum allowable current of the power switch (I) of the asymmetrically-sized bidirectional choppers (3, 4) is higher by at least a factor of 1½.

7. The electric energy storage system according to claim 1, wherein said asymmetrically-sized bidirectional chopper(s) (3, 4) each comprise no more than four power switches (I).

8. The electric energy storage system according to claim 7, wherein said power switches include at least one of power transistors of the IGBT (Insulated Gate Bipolar Transistor) type or the GTO (Gate Turn Off thyristor) type or the Thyristor or MOSFET or JFET or BIPOLAR type.

9. The electric energy storage system according to claim 1, wherein a power of the shared inverter (6) is comprised between 50 kW and 5 MW.

10. The electric energy storage system according to claim 1, wherein among the electric energy storage units (1, 2), there are one or more batteries and one or more supercapacitors.

11. The electric energy storage system according to claim 1, wherein the number of said associations (21, 22) is comprised between 2 and 15.

12. The electric energy storage system according to claim 1, wherein the bidirectional chopper (3, 4) is booster chopper(s).

13. The electric energy storage system according to claim 1, wherein the input voltage of the inverter (6) is comprised between 300 and 2000 V.

14. The electric energy storage system according to claim 1, further comprising a controller (14) for the inverter (6) that drives the inverter (6) and a controller (13) of the storage units (1, 2) that drives the storage units (1, 2), the two controllers (13, 14) being connected to each other so as to synchronize the two commands with each other or in that it comprises a controller (14) for the inverter (6) that drives the inverter (6) and several controllers (11, 12) for the storage units (1, 2), respectively, that drive the storage units (1, 2), the controller (14) for the inverter (6) being connected to the respective controllers (11, 12) of the storage units (1, 2) so as to synchronize its driving with their respective driving operations.

15. An electrical facility is also provided comprising an AC electrical network (7) and an electrical energy storage system according to claim 1 that is connected to said AC electrical network (7) so as to be able to power said AC electrical network (7).

16. The electrical facility according to claim 15, wherein the electrical facility is an electricity production or distribution facility.

17. The electrical facility according to claim 15, wherein one or more solar panels and one or more fuel cells and one or more wind turbines are connected after voltage adaptation, in parallel with the energy storage units (1, 2), to said input of the inverter (6), preferably respectively by means of one or more monodirectional choppers.

18. An electric energy storage system circuit, comprising, successively connected in series:
   electric energy storage unit (1, 2) that can be charged and discharged asymmetrically,
   a bidirectional chopper (3, 4) comprising several power switches of different sizes configured to be used in discharge or charge direction, and
   an oversized inverter (6) relative to the bidirectional chopper (3, 4) having several power switches (I) and a common input configured to be shared with other choppers,
   wherein the bidirectional chopper (3, 4) is sized asymmetrically for the charge and discharge of the storage unit (1, 2) such that the power switch of the bidirectional chopper used in the discharge direction has a maximum allowable current different than that of the power switch used in the charge direction, and
   wherein the power switches (I) of the oversized inverter (6) are sized so that their maximum allowable current is lower than the sum of the maximum allowable power switch current upper bounds respectively of all of the choppers (3, 4) connected to said same input of the oversized inverter (6), if applicable increased by the maximum allowable currents of any storage unit(s) not associated with choppers but connected to said same input of the oversized inverter (6).

19. The electric energy storage system according to claim 1, wherein the power switches (I) of the inverter (6) are sized so that their maximum allowable current is at least 10% lower.

20. The electric energy storage system according to claim 1, wherein the power switches (I) of the inverter (6) are sized so that their maximum allowable current is at least 20% lower.

* * * * *